(12) United States Patent
Nakai et al.

(10) Patent No.: US 6,956,341 B2
(45) Date of Patent: Oct. 18, 2005

(54) MOTOR DRIVING CONTROL DEVICE

(75) Inventors: Hideo Nakai, Nisshin (JP); Hiroo Fuma, Gifu (JP); Yukio Inaguma, Nagoya (JP); Seiji Nakamura, Nagoya (JP)

(73) Assignees: Kabushiki Kaisha Toyota Chuo Kenkyusho, Aichi-gun (JP); Toyota Jidosha Kabushiki Kaisha, Toyota (JP)

( * ) Notice: Subject to any disclaimer, the term of this patent is extended or adjusted under 35 U.S.C. 154(b) by 51 days.

(21) Appl. No.: 10/627,774

(22) Filed: Jul. 28, 2003

(65) Prior Publication Data
US 2004/0075406 A1 Apr. 22, 2004

(30) Foreign Application Priority Data
Jul. 26, 2002 (JP) ......................................... 2002-217454

(51) Int. Cl.$^7$ ................................................. H02P 3/08
(52) U.S. Cl. ..................... 318/254; 318/138; 318/439; 318/432; 318/720
(58) Field of Search .............................. 318/138, 254, 318/439, 700, 720–724, 432, 434

(56) References Cited

U.S. PATENT DOCUMENTS

| 5,410,234 | A | * | 4/1995 | Shibata et al. ............... 318/700 |
| 5,444,351 | A | * | 8/1995 | Yamamura et al. ......... 318/811 |
| 6,281,656 | B1 | * | 8/2001 | Masaki et al. ............... 318/700 |
| 6,388,416 | B1 | * | 5/2002 | Nakatani et al. ............ 318/700 |
| 6,456,030 | B1 | * | 9/2002 | Masaki et al. ............... 318/700 |
| 6,462,491 | B1 | * | 10/2002 | Iijima et al. ................. 318/254 |
| 6,630,804 | B2 | | 10/2003 | Moriya et al. |
| 6,700,400 | B2 | * | 3/2004 | Atarashi ....................... 324/772 |

FOREIGN PATENT DOCUMENTS

| JP | 10-225199 | 8/1998 |
| JP | 2001-309697 | 11/2001 |

* cited by examiner

Primary Examiner—Rina Duda
(74) Attorney, Agent, or Firm—Oblon, Spivak, McClelland, Maier & Neustadt, P.C.

(57) ABSTRACT

Two inverters (INV1, INV2) supply phase currents to three-phase coils (Y1, Y2). Although two phase currents must conventionally be measured and four current sensors are thus required, according to the present invention, the number of phase currents to be measured is reduced as a result of use of an observer for phase current estimation.

10 Claims, 7 Drawing Sheets

US 6,956,341 B2

MOTOR DRIVING CONTROL DEVICE

BACKGROUND OF THE INVENTION

1. Field of the Invention

The present invention relates to a driving control device for a motor having a plurality of multi-phase coils for generating a rotating magnetic field to cause a rotor to rotate.

2. Description of the Related Art

Conventional AC motors, such as permanent magnetic motors and induction motors, use a stator coil to form a rotating magnetic field to thereby cause the rotor to rotate. Such AC motors use an inverter to control a stator coil current, and thereby can advantageously achieve control of an output torque over a wide range, as well as collection of a regenerative power in a battery.

The most common example of such an AC motor may be a three-phase motor having a three-phase coil with three phases displaced by 120 degrees from one another. Some systems, such as a system for driving two or more three-phase motors, may have two or more three-phase coils, and some motors having two or more three-phase coils for a single rotor may also have two or more three-phase coils in a single system.

In such a motor, each three-phase coil is provided with an inverter, and driving of the motor is controlled by controlling switching of the respective inverters. For this purpose, respective three-phase coil currents should be separately measured so that switching of the inverters are controlled based on the measurement result. In general, coil currents of two phases out of the three phases are measured for calculation of the three-phase coils, and inverter switching is controlled such that coil currents of the respective phases have desired values.

Therefore, in the case of a motor having a six-phase coil, four or more current sensors are required, which must be accurate sensors in order to precisely control the AC motor. As such a large number of current sensors are required, a resultant system is inevitably expensive.

It should be noted that a motor with an observer applied thereto is disclosed, for example, in Japanese Patent Laid-open Publication Nos. Hei 10-225199 and 2000-309697.

SUMMARY OF THE INVENTION

The present invention advantageously reduces the number of current sensors required.

According to one aspect of the present invention, a motor current is estimated using a model. As a result, measurements of only a reduced number of coil currents are necessary with respect to a multi-phase coil, such as a three-phase coil. For example, for a motor having two three-phase coils comprising three wires of three phases, although four coil currents must conventionally be measured as each of the three-phase coils requires two phases of currents to be measured, according to the present invention, as a result of use of model estimation, only a reduced number of coil currents need to be measured in order to control motor driving.

According to another aspect of the present invention, an addition phase current, or addition of two or more phase currents, is measured. As a result, a model can be made with fewer current measurements, and a phase current can be estimated using the model. For a structure in which two multi-phase coils are connected at their neutral points, a zero-phase current, which flows between the connected neutral points, must be measured using a different model.

DESCRIPTION OF THE PREFERRED EMBODIMENT

A preferred embodiment of the present invention will be described with reference to the accompanied drawings.

In this embodiment, an observer of a six-phase motor is defined so that coil currents of the six-phase motor are calculated using the defined observer and a fewer number of sensors to control driving of the six-phase motor.

[Basic Structure]

Figure 11:
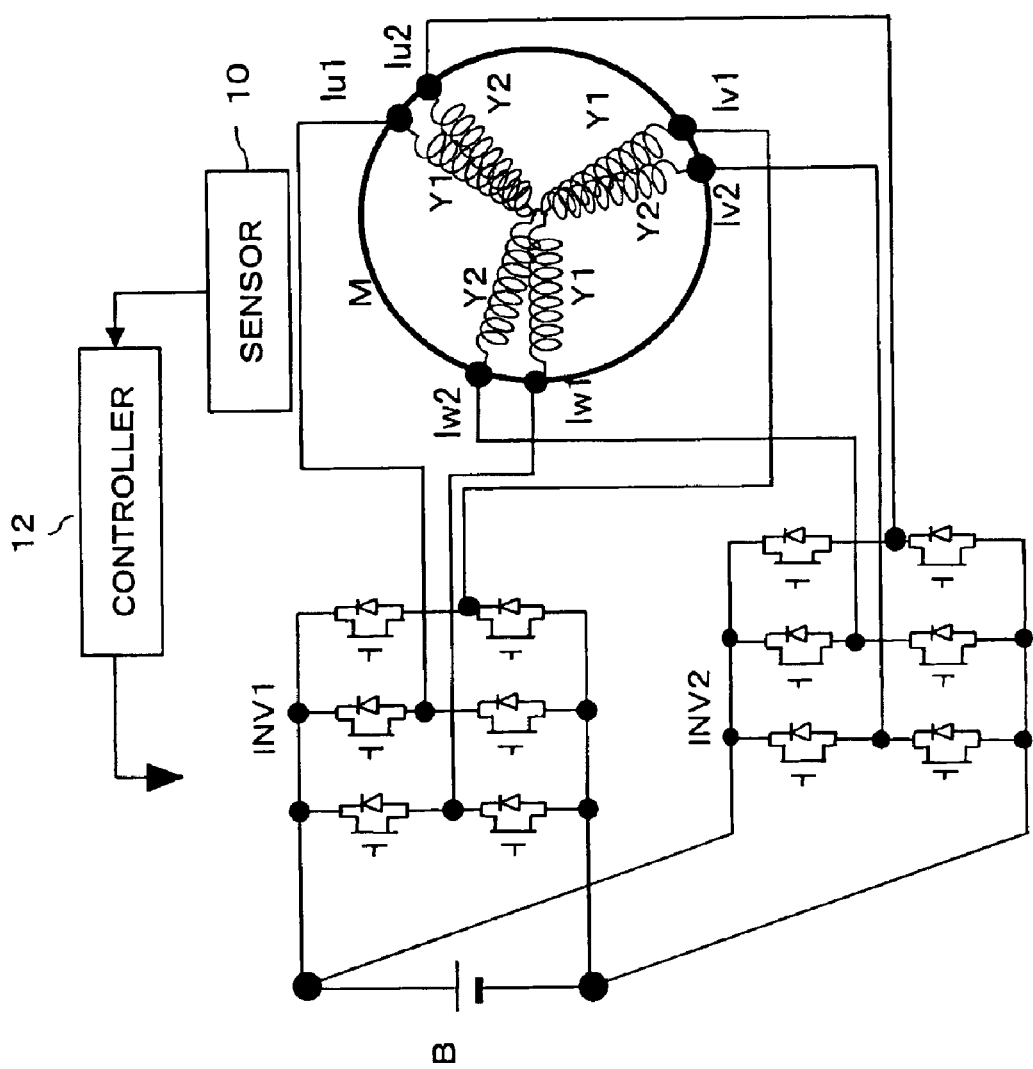
FIG. 11 is a diagram showing a basic structure of a six-phase motor.

FIG. 11 shows a basic structure of a six-phase motor M, which comprises two three-phase coils Y1 and Y2. The three-phase coil Y1 is connected to an inverter INV1, while the three-phase coil Y2 is connected to an inverter INV2. The inverters INV1 and INV2 each has three arms each comprising a pair of serially,connected switching elements, and connection points between the respective paring transistors (switching elements) are connected to the respective three coil ends of the corresponding three-phase coil Y1 or Y2.

Inputs of the inverters INV1 and INV2 are connected to a battery B. A sensor 10 is provided for multiple measurements of phase currents of the motor M in various combinations as described below, and supplies a detection signal to a controller 12.

The controller 12, which incorporates a model showing the present state of the motor, estimates the present state of the motor, using the model and a detection signal from the sensor 10, and controls the turning on and off of the switching elements of the inverters INV1 and INV2 based on the results of the estimation.

The inverter INV1 supplies currents Iu1, Iv1, Iw1, the phases of which differ by 120 degrees from one another, to the three-phase coil Y1, while the inverter INV2 supplies currents Iu2, Iv2, Iw2, the phases of which differ by 120 degrees from one another, to the three-phase coil Y2.

It should be noted that, although the shown system comprises two independent three-phase coils Y1 and Y2, an alternative system may comprise two three-phase coils Y1 and Y2 which are connected to each other at the respective neutral points by a low voltage battery. In this system, a capacitor may be used in place of the battery B.

[Circuit Equation]

A circuit equation for a permanent magnet (PM) motor having two star connection coils will be described.

Figure 1:
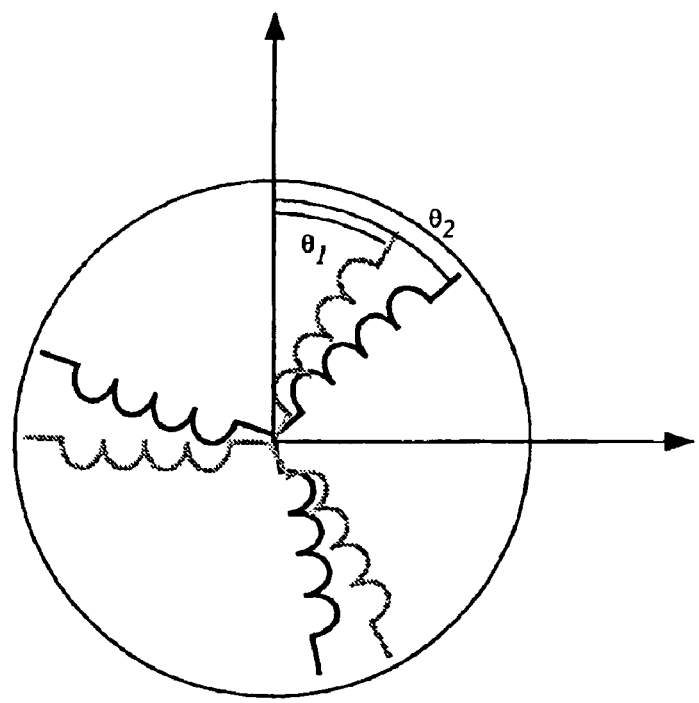
FIG. 1 is a diagram showing a structure of a six-phase motor.

FIG. 1 schematically shows a six-phase motor of interest, in which two star-connected coils Y1 and Y2 are arranged out of phase. In this example, the first star-connected coil Y1 is arranged on the stator so as to have an angle θ1 relative to a reference position (upward direction in the drawing), while the second star-connected coil Y2 is arranged so as to have an angle θ2 relative to the reference position. Each of the star-connected coils Y1 and Y2 comprises three coil sets which are star-connected to one another with an angle of 120 degrees displaced from one another.

A voltage equation for the PM motor of FIG. 1 is expressed as equation (1).

$$\hat{v} = R\hat{i} + \hat{v}_m + \frac{d}{dt}\left\{\left(\hat{l}_a I_6 + \begin{pmatrix} \hat{m}(\theta_1, \theta_1) & \hat{m}(\theta_1, \theta_2) \\ \hat{m}(\theta_2, \theta_1) & \hat{m}(\theta_2, \theta_2) \end{pmatrix}\right)\hat{i}\right\} \quad (1)$$

$$\hat{v} = \begin{pmatrix} v_{u1} \\ v_{v1} \\ v_{w1} \\ v_{u2} \\ v_{v2} \\ v_{w2} \end{pmatrix} \quad (2)$$

$$\hat{i} = \begin{pmatrix} i_{u1} \\ i_{v1} \\ i_{w1} \\ i_{u2} \\ i_{v2} \\ i_{w2} \end{pmatrix} \quad (3)$$

$$\hat{v}_m = \omega\hat{\psi}_m \begin{pmatrix} \sin\theta_1 \\ \sin\left(\theta_1 - \frac{2\pi}{3}\right) \\ \sin\left(\theta_1 + \frac{2\pi}{3}\right) \\ \sin\theta_2 \\ \sin\left(\theta_2 - \frac{2\pi}{3}\right) \\ \sin\left(\theta_2 + \frac{2\pi}{3}\right) \end{pmatrix} \quad (4)$$

$$\hat{m}(x, y)|_{i,j} = \hat{L}_d \cos x_i \cos y_j + \hat{L}_q \sin x_i \sin y_j \quad (5)$$

$(i = 1, 2, 3, \quad j = 1, 2, 3)$ $x_1 = x$ $x_2 = x - \frac{2\pi}{3}$ $x_3 = x + \frac{2\pi}{3}$ $y_1 = y$ $y_2 = y - \frac{2\pi}{3}$ $y_3 = y + \frac{2\pi}{3}$ wherein, ^v, R, ^i, ^vm, ^la, ^m(θ1, θ1), ^m(θ1, θ2), ^m(θ2, θ1), ^m(θ2, θ2) respective represent a terminal voltage of the star connection, a coil resistance, a phase current of the coil, a voltage caused by a magnetic flux caused by the magnet, a leak magnetic flux of the coil, inductance between coil sets of the Y1 connection, inductance of a magnetic flux caused in the coil of the Y1 connection by a current flowing in the Y2 connection, inductance of a magnetic flux caused in the coil of the Y2 connection by a current flowing in the Y1 connection, and inductance between coil sets of the Y2 connection.

Index numbers, namely, 1 and 2, attached to each element of a vector on the right side of equations (2) and (3) respectively identify Y1 and Y2 connections, and index alphabets, namely, u, v, w, respectively identify U phase, V phase, and W phase. That is, "Vu1", for example, refers to a terminal voltage of U-phase of the Y1 connection. ^Ld and ^Lq in equation (5) respectively represent inductance of d and q axes, and ^m(x,y)|i,j refers to an element at row i and column j in the matrix ^m(x, y).

[Observer of Six-Phase Motor]

An observer for a six-phase motor will be described.

(With Interference between Phases)

A state equation of a six-phase motor, or equation (1) is converted so as to be defined relative to d and q axes, whereby equations (6) and (14) are obtained.

Equation (6) expresses a current component which contributes to torque available for effective use by the motor, while equation (14) expresses a current component which does not contribute to available torque. In the equations, id1, id2, iq1, iq2, vd1, vd2, vq1, vq2, ψm, iγ12, vγ1, vγ2 respectively represent a d-axial current of the Y1 connection, a d-axial current of the Y2 connection, a q-axial current of the Y1 connection, a q-axial current of the Y2 connection, a d-axial voltage of the Y1 connection, a d-axial voltage of the Y2 connection, a q-axial voltage of the Y1 connection, a q-axial voltage of the Y2 connection, a coefficient of an electromotive force by a magnet (Vs/rad), a zero-phase current, a neutral point voltage of the Y1 star connection, and a neutral point voltage of the Y2 star connection. Ld and Lq respectively represent inductance of the d and q axes, and ^Ld and ^Lq retain such a relationship that one is as large as of the other. ω represents an electric angular speed (rad/s).

$$\frac{d}{dt}\overline{x} = \overline{A}(\omega)\overline{x} + \overline{B}_u\overline{u} - \overline{B}_u\overline{v} \quad (6)$$

$$\overline{x} = \begin{pmatrix} i_{d1} \\ i_{d2} \\ i_{q1} \\ i_{q2} \end{pmatrix} \quad (7)$$

$$\overline{u} = \begin{pmatrix} v_{d1} \\ v_{d2} \\ v_{q1} \\ v_{q2} \end{pmatrix} \quad (8)$$

$$\overline{v} = \begin{pmatrix} 0 \\ 0 \\ \omega\psi_m \\ \omega\psi_m \end{pmatrix} \quad (9)$$

$$\bar{A}(\omega) = \begin{pmatrix} \frac{-R}{\delta_d l_a}\begin{pmatrix} L_d+l_a & -L_d \\ -L_d & L_d+l_a \end{pmatrix} & \frac{\omega}{\delta_d}\begin{pmatrix} L_d+L_q+l_a & L_q-L_d \\ L_q-L_d & L_d+L_q+l_a \end{pmatrix} \\ \frac{-\omega}{\delta_q}\begin{pmatrix} L_d+L_q+l_a & L_d-L_q \\ L_d-L_q & L_d+L_q+l_a \end{pmatrix} & \frac{-R}{\delta_q l_a}\begin{pmatrix} L_q+l_a & -L_q \\ -L_q & L_q+l_a \end{pmatrix} \end{pmatrix} \quad (10)$$

$$\bar{B}_u = \begin{pmatrix} \frac{1}{\delta_d l_a}\begin{pmatrix} L_d+l_a & -L_d \\ -L_d & L_d+l_a \end{pmatrix} & \phi_{2\times 2} \\ \phi_{2\times 2} & \frac{1}{\delta_q l_a}\begin{pmatrix} L_q+l_a & -L_q \\ -L_q & L_q+l_a \end{pmatrix} \end{pmatrix} \quad (11)$$

$$\delta_d = 2L_d + l_a \quad (12)$$

$$\delta_q = 2L_q + l_a \quad (13)$$

$$\frac{d}{dt}x_z = ax_z + b_u u_z \quad (14)$$

$$x_z = i_{\gamma/2} \quad (15)$$

$$u_z = v_{\gamma 1} - v_{\gamma 2} \quad (16)$$

$$a = -\frac{R}{l_a} \quad (17)$$

$$b_u = \frac{1}{l_a} \quad (18)$$

Equations (6) and (14) are to be estimated. In the estimation, these equations must be considered separately as these are independent from each other.

Initially, as for equation (6), assuming a constant angular speed, because equation (6) represents a general linear model, a normal observer can be used for estimation of equation (6). This assumption can be held in consideration of a steady rotation of the motor, and is believed to be held when an inertia load is imposed on the motor as, in such a case, rotation inertia of the motor is large and an angular speed variation is sufficiently large relative to a current variation.

Then, observability of these two state equations will be considered. Observability of equation (6) is considered using a motor having characteristics of Ld=0.2486 mH, Lq=0.5695 mH, la=0.19 mH, R=46.5 mΩ, φm=0.0516 V/(rad/s), four polar pairs, and rotor revolution 3000 rpm (ω=1257 rad/s).

Initially, such a condition that allows observation of one current alone is considered. That is, an observation matrix is C=(1 0 0 0), C=(0 1 0 0), C=(0 0 1 0), C=(0 0 0 1). With this condition, $\bar{A}(\omega)$ and C constitute an observable pair, and equation (6) is thus observable.

Meanwhile, as the motor is designed so as to minimize resistance, observability when R=0 is also considered. Initially, a condition that allows observation of one current alone is considered. That is, an observation matrix is C=(1 0 0 0), C=(0 1 0 0), C=(0 0 1 0), C=(0 0 0 1). With this condition, $\bar{A}(\omega)$ and C do not constitute an observable pair, and equation (6) is thus not observable.

Subsequently, a condition that allows observation of two currents is considered. That is, an observation matrix is C=(1 1 0 0), C=(1 0 1 0), C=(1 0 0 1), C=(1 0 0 1). With this condition, $\bar{A}(\omega)$ and C constitute an observable pair, and equation (6) is thus observable.

In estimation using an actual motor, whether one or two currents is to be observed must be appropriately selected depending on the magnitude of the resistor R.

Meanwhile, as for equation (14), direct measurement is the sole option as there is only one state value.

Then, equation (6) is considered here again, and rewritten into equation (19).

$$\frac{d}{dt}x = A(\omega)x + B_u u + B_v v \quad (19)$$

$$x = \begin{pmatrix} i_{d1} \\ i_{d2} \\ i_{q1} \\ i_{q2} \end{pmatrix} \quad (20)$$

$$u = \begin{pmatrix} v_{d1} \\ v_{d2} \\ v_{q1} \\ v_{q2} \end{pmatrix} \quad (21)$$

$$v = \begin{pmatrix} 0 \\ 0 \\ \omega \psi_m \\ \omega \psi_m \end{pmatrix} \quad (22)$$

$$A(\omega) = \bar{A}(\omega) \quad (23)$$

$$B_u = \bar{B}_u \quad (24)$$

$$B_v = -\bar{B}_u \quad (25)$$

Here, as an observable value is of a phase current y, when a system output is expressed as equation (26) and w represents an observation noise, an observer can be formed as equation (28).

$$y = Cx_p + w \quad (26)$$

$$x_p = \begin{pmatrix} i_{u1} \\ i_{v1} \\ i_{w1} \\ i_{u2} \\ i_{v2} \\ i_{w2} \end{pmatrix} \quad (27)$$

$$\frac{d}{dt}x_e = A(\omega)x_e + \hat{L}(y - CT'_e(\theta_1, \theta_2)x_e) + B_u u + B_v v \quad (28)$$

$$T_e(\theta_1, \theta_2) = \begin{pmatrix} t(\theta_1)\bar{t} & \phi_{2\times 3} \\ \phi_{2\times 3} & t(\theta_2)\bar{t} \end{pmatrix} \quad (29)$$

$$\bar{t} = \sqrt{\frac{2}{3}}\begin{pmatrix} 1 & -1/2 & -1/2 \\ 0 & \sqrt{3}/2 & -\sqrt{3}/2 \end{pmatrix} \quad (30)$$

wherein C represents a matrix (nc=1,2) of nc rows and six columns. Here, an estimated value of xp is determined as xe.

However, as the above equation as is cannot define an observer gain ^L in equation (28), ^L=L(ω)Ta(θ) is introduced so that equation (28) is rewritten as equation (31).

$$\frac{d}{dt}x_e = A(\omega)x_e + L(\omega)(T_a(\theta)y - T_a(\theta)CT'_e(\theta_1, \theta_2)x_e) + \quad (31)$$
$$B_u u + B_v v$$

Then, selection of $T_a(\theta)C$ such that $T_a(\theta)CT_e'(\theta_1,\theta_2)$ remains constant irrespective of $\theta$ leads to a linear observer in which an input to the system is considered as $T_a(\theta)y$.

An example including two observable values is next considered.

Assuming $$T_a(\theta)=t(\theta) \quad (32)$$

and $C=(C1,C2)$, in which C1 indicates three front columns and C2 indicates two rear columns, the above condition can be described as follows.

$$T_a(\theta)CT'_e(\theta_1,\theta_2)=(t(\theta)C_1\hat{t}'t'(\theta_1)\ t(\theta)C_2\hat{t}'t'(\theta_2)) \quad (33)$$

Here, when $C1\hat{\ }t'=\alpha 1 I2$ and $\hat{\ }t'=\alpha 2 I2$ ($\alpha 1$ and $\alpha 2$ are constants) are held, $T_a(\theta)CT_e'(\theta 1, \theta 2)$ is a constant matrix. $C1=\hat{\ }t$, $C2=\hat{\ }t$ is one solution which satisfies this condition. However, because this solution requires observation of all phases of currents, use of an observer provides no advantage. Then, C is expressed as equation (34).

$$C = \left( \begin{pmatrix} 1 & 0 & 0 & 1 & 0 & 0 \\ \frac{1}{\sqrt{3}} & \frac{2}{\sqrt{3}} & 0 & \frac{1}{\sqrt{3}} & \frac{2}{\sqrt{3}} & 0 \end{pmatrix} \right) \quad (34)$$

Then, $T_e'(\theta 1, \theta 2)$ can be expressed as equation (35) based on equation (29), and $CT_e'(\theta 1, \theta 2)$ can be expressed as equation (37) based on equations (34) and (35). Further, $T_a(\theta 1,\theta 2)CT_e'(\theta 1,\theta 2)$ can be expressed as equation (38) based on equations (32) and (37), in which I2 is a unit matrix of two rows and two columns.

$$T_e'(\theta_1, \theta_2) = \begin{pmatrix} m_{cs}(\theta_1) & \phi_{3\times 2} \\ \phi_{3\times 2} & m_{cs}(\theta_2) \end{pmatrix} \quad (35)$$

$$m_{cs}(\theta) = \sqrt{\frac{2}{3}} \begin{pmatrix} \cos\theta & -\sin\theta \\ \cos\left(\theta - \frac{2\pi}{3}\right) & -\sin\left(\theta - \frac{2\pi}{3}\right) \\ \cos\left(\theta - \frac{4\pi}{3}\right) & -\sin\left(\theta - \frac{4\pi}{3}\right) \end{pmatrix} \quad (36)$$

$$CT_e'(\theta_1, \theta_2) = \sqrt{\frac{2}{3}}\ (t'(\theta_1)\ t'(\theta_2)) \quad (37)$$

$$T_a(\theta)CT_e'(\theta_1, \theta_2) = \sqrt{\frac{2}{3}} \begin{pmatrix} I_2 & t(\theta_1 - \theta_2) \\ t'(\theta_1 - \theta_2) & I_2 \end{pmatrix} \quad (38)$$

Here, because $\theta 1-\theta 2$ is a constant value, $T_a(\theta)CT_e'(\theta 1, \theta 2)$ becomes a constant value based on equation (38). Here, assuming $Ct=T_a(\theta)CT_e'(\theta 1,\theta 2)$ and an input being $yt=T_a(\theta)y$, equation (31) resultantly expresses a linear observer for equation (39).

$$\frac{d}{dt}x_e = A(\omega)x_e + L(\omega)(y_t - C_t x_e) + B_u u + B_v v \quad (39)$$

It should be noted that an actual observer collectively measures phase currents (iu1 and iu2) and phase currents (iv1 and iv2) to obtain an observation value ~y as follows.

$$\tilde{y} = \begin{pmatrix} i_{u1} + i_{u2} \\ i_{v1} + i_{v2} \end{pmatrix} + \tilde{w} \quad (40)$$

Then, using this measured current value as follows, an observer is formed.

$$\frac{d}{dt}x_e = A(\omega)x_e + L(\omega)(T_a(\theta)y - C_t x_e) + B_u u + B_v v \quad (41)$$

$$y = \begin{pmatrix} 1 & 0 \\ 1/\sqrt{3} & 2/\sqrt{3} \end{pmatrix} \tilde{y} + w \quad (42)$$

As described above, use of a linear observer in equations (41) and (42) makes it possible to recognize the state of the motor by observing (iu1+iu2) and (iv1+iv2). That is, with respect to a motor having three three-phase coils, it is possible to determine the state of the motor by measuring two currents to control a driving current of the motor.

Next, an example having one observed value is considered.

Initially, if there is any $T_a(\theta)C$ available which makes constant $T_a(\theta)CT_e'(\theta 1, \theta 2)$ irrespective of $\theta$ is considered.

$$T_a(\theta)CT_e'(\theta_1, \theta_2) = T_a(\theta)(C_1\ C_2)\begin{pmatrix} m_{cs}(\theta_1) & \phi_{3\times 2} \\ \phi_{3\times 2} & m_{cs}(\theta_2) \end{pmatrix} \quad (43)$$
$$= T_a(\theta)(C_1 m_{cs}(\theta_1)\ C_2 m_{cs}(\theta_2))$$

As equation (43) is a scalar function and C1 and C2 are each a constant matrix of one row and three columns, determination of a value $T_a(\theta)$ which makes these matrixes constant matrixes is a complicated task. That is, application of a linear observer is difficult.

Then, equation (28) is considered here again. It is necessary here to apply a non-linear observer to make gain ^L to be ~L($\theta$, $\omega$) and to form an observer as below.

$$\frac{d}{dt}x_e = A(\omega)x_e + \tilde{L}(\theta, \omega)(y - CT_e'(\theta_1, \theta_2)x_e) + B_u u + B_v v \quad (44)$$

That is, when a non-linear observer is used, measurement of a single current is sufficient. It should be noted that a zero-phase current in equation (14) must be separately measured.

In view of the above, it is concluded that the following methods are available to obtain information necessary to drive a six-phase motor.

Specifically, for a system in which two three-phase coils are connected to each other at their respective neutral points, the following two methods are applicable.

(1) A zero-phase current and other two currents (iu1+iu2, iv1+iv2) are measured, and applied to a linear observer.

Figure 2:
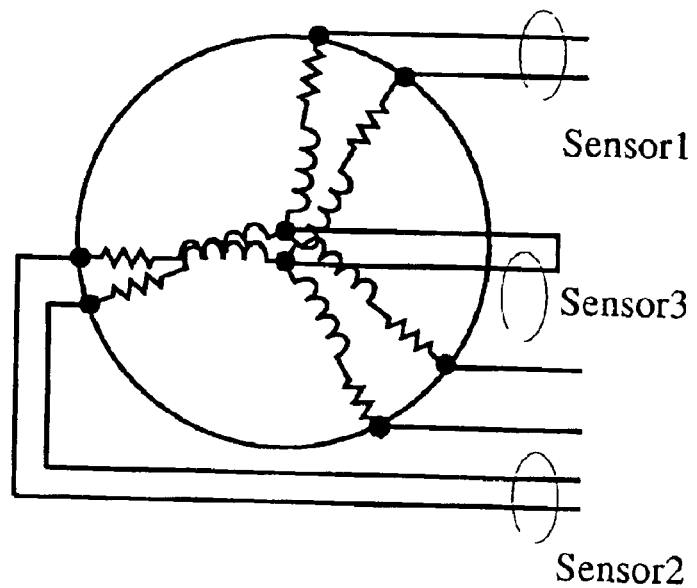
FIG. 2 is a diagram showing an example arrangement of three current sensors with a zero-phase current flowing.

Specifically, three sensors (sensors 1 to 3) are provided to measure addition phase currents (iu1+iu2, iv1+iv2) and a zero-phase current, as shown in FIG. 2.

(2) A zero-phase current and another current are measured, and applied to a non-linear observer.

Figure 3:
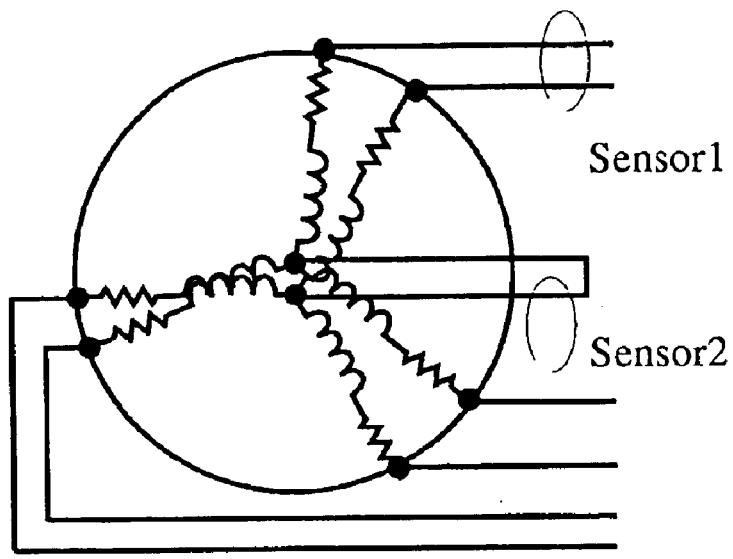
FIG. 3 is a diagram showing an example arrangement of two current sensors with no zero-phase current flowing.

Specifically, two sensors (sensors 1 and 2) are provided to measure an addition phase current (iu1+iu2) and a zero-phase current, as shown in FIG. 3.

In a motor having two three-phase motors each having two independent, or not connected to each other at their neutral points, three-phase coils, the following two methods are applicable.

(1) Currents (iu1+iu2, iv1+iv2) are measured, and applied to a linear observer.

Figure 4:
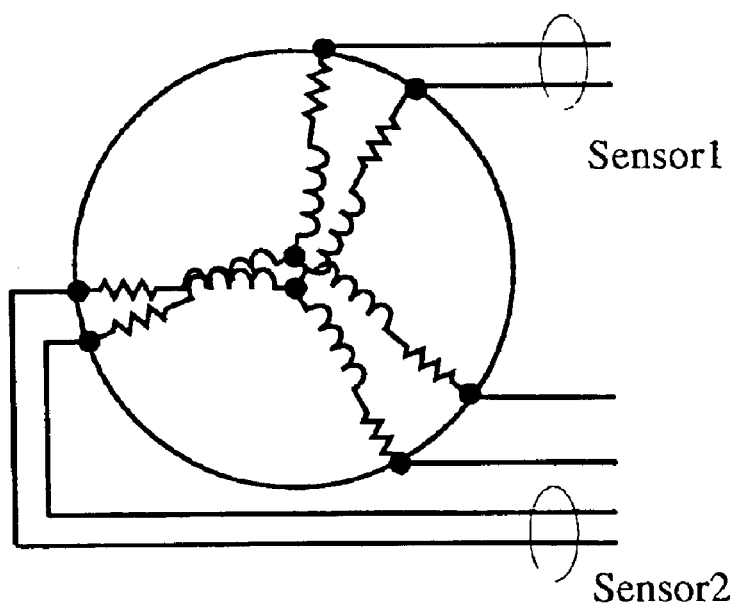
FIG. 4 is a diagram showing an example arrangement of two current sensors with no zero-phase current flowing.

Specifically, two sensors (sensors 1 and 2) are provided to measure addition phase currents (iu1+iu2, iv1+iv2), as shown in FIG. 4.

(2) A current is measured, and applied to a non-linear observer.

Figure 5:
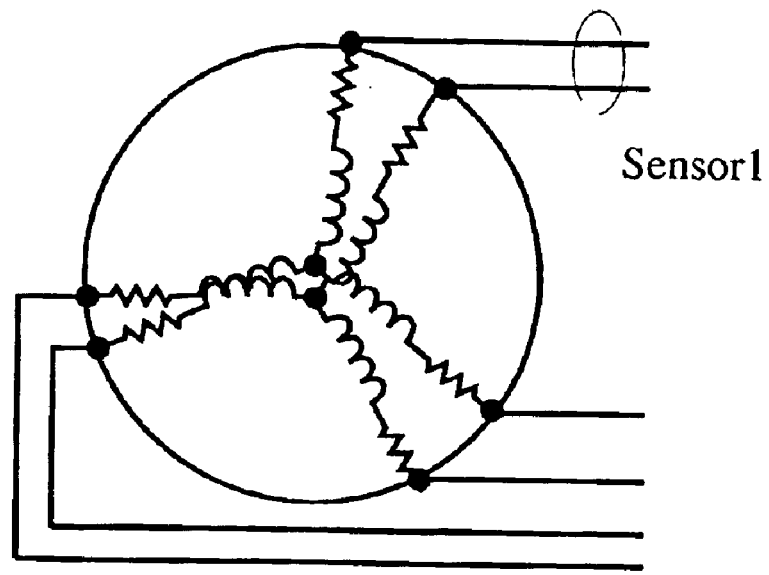
FIG. 5 is a diagram showing an example arrangement of one current sensor with no zero-phase current flowing.

Specifically, one sensor (sensor 1) is provided to measure an addition phase current (iu1+iu2), as shown in FIG. 5.

(Without Interference Between Phases)

An example in which two star connections Y1 and Y2 do not interfere with each other will be described. In this example, a state equation of a six-phase motor is expressed as equations (45) and (51).

$$\frac{d}{dt}\overline{x} = \overline{A}(\omega)\overline{x} + \overline{B}_u\overline{u} - \overline{B}_u\overline{v} \tag{45}$$

$$\overline{x} = \begin{pmatrix} i_{d1} \\ i_{d2} \\ i_{q1} \\ i_{q2} \end{pmatrix} \tag{46}$$

$$\overline{u} = \begin{pmatrix} v_{d1} \\ v_{d2} \\ v_{q1} \\ v_{q2} \end{pmatrix} \tag{47}$$

$$\overline{v} = \begin{pmatrix} 0 \\ 0 \\ \omega\psi_m \\ \omega\psi_m \end{pmatrix} \tag{48}$$

$$\overline{A}(\omega) = \begin{pmatrix} \frac{-R}{L_d}I_2 & \omega\frac{L_q}{L_d}I_2 \\ -\omega\frac{L_d}{L_q}I_2 & \frac{-R}{L_q}I_2 \end{pmatrix} \tag{49}$$

$$\overline{B}_u = \begin{pmatrix} \frac{1}{L_d}I_2 & \phi_{2\times 2} \\ \phi_{2\times 2} & \frac{1}{L_q}I_2 \end{pmatrix} \tag{50}$$

$$\frac{d}{dt}x_z = -\frac{R}{l_a}x_z + \frac{1}{l_a}u_z \tag{51}$$

$$x_z = i_{\gamma l2} \tag{52}$$

$$u_z = v_{\gamma 1} - v_{\gamma 2} \tag{53}$$

Equations (45) and (51) are both estimated, and must be considered separately as these are independent from each other. In addition, equation (45) must be considered separately with respect to first and second star connections Y1 and Y2 as these are independent from each other.

Initially, as for equation (45), assuming a constant angular speed, because equation (45) represents a general linear model, a normal observer can be used for estimation of equation (45). This assumption can be held in consideration of a steady rotation of the motor, and is believed to be held when an inertia load is imposed on the motor as, in such a case, rotation inertia of the motor is large and an angular speed variation is sufficiently large relative to a current variation.

Then, observability of these two state equations will be considered.

Observability of equation (6) is considered using a motor having characteristics of Ld=0.2486 mH, Lq=0.5695 mH, la=0.19 mH, R=46.5 mΩ, φm=0.0516 V/(rad/s), four polar pairs, and rotor revolution 3000 rpm(ω=1257 rad/s).

Because equation (45) contains two independent state equations, use of the following observation matrix is obviously inappropriate.

$$C = (1\ 0\ 0\ 0),\ C = (1\ 1\ 0\ 0),\ C = \begin{pmatrix} 1 & 0 & 0 & 0 \\ 0 & 1 & 0 & 0 \end{pmatrix}$$

In addition, in consideration of observability, it is known that use of an observation matrix of C=(1 0 1 0), C=(1 0 0 1) and so on is also inappropriate. Here, considering each of the independent observabilities, it is observable even with R=0 as along as one state value alone is measurable. That is, the following observation matrix can be employed.

$$C = \begin{pmatrix} 1 & 0 & 0 & 0 \\ 0 & 0 & 1 & 0 \end{pmatrix},\ C = \begin{pmatrix} 1 & 0 & 0 & 0 \\ 0 & 0 & 0 & 1 \end{pmatrix}$$

With this condition, $\overline{A}(\omega)$ and C constitute an observable pair, and equation (45) is thus observable.

As for equation (51), direct measurement is a sole option as there is only one state value.

Then, equation (45) to be estimated is considered here again, and rewritten into equations (54) to (60).

$$\frac{d}{dt}x = A(\omega)x + B_u u + B_v v \tag{54}$$

$$x = \begin{pmatrix} i_{d1} \\ i_{d2} \\ i_{q1} \\ i_{q2} \end{pmatrix} \tag{55}$$

$$u = \begin{pmatrix} v_{d1} \\ v_{d2} \\ v_{q1} \\ v_{q2} \end{pmatrix} \tag{56}$$

$$v = \begin{pmatrix} 0 \\ 0 \\ \omega\psi_m \\ \omega\psi_m \end{pmatrix} \tag{57}$$

$$A(\omega) = \overline{A}(\omega) \tag{58}$$

$$B_u = \overline{B}_u \tag{59}$$

$$B_v = -\overline{B}_u \tag{60}$$

Here, as an observable value is of a phase current y, when a system output is expressed as equation (61) in which w indicates an observation noise, an observer can be formed as equation (63).

$$y = Cx_p + w \tag{61}$$

$$x_p = \begin{pmatrix} i_{u1} \\ i_{v1} \\ i_{w1} \\ i_{u2} \\ i_{v2} \\ i_{w2} \end{pmatrix} \tag{62}$$

-continued $$\frac{d}{dt}x_e = A(\omega)x_e + \hat{L}(y - CT'_e(\theta_1, \theta_2)x_e) + B_u u + B_v v \qquad (63)$$

$$T_e(\theta_1, \theta_2) = \begin{pmatrix} t(\theta_1)\bar{t} & \phi_{2\times 3} \\ \phi_{2\times 3} & t(\theta_2)\bar{t} \end{pmatrix} \qquad (64)$$

$$\bar{t} = \sqrt{\frac{2}{3}} \begin{pmatrix} 1 & -1/2 & -1/2 \\ 0 & \sqrt{3}/2 & -\sqrt{3}/2 \end{pmatrix} \qquad (65)$$

wherein C indicates a matrix (nc=1,2) of two rows and six columns as taking into consideration of observability.

However, as the above equation as is cannot determine an observer gain ^L in equation (63), ^L=L(ω)Ta(θ) is introduced so that equation (63) can be expressed as equation (66).

$$\frac{d}{dt}x_e = A(\omega)x_e + L(\omega)(T_a(\theta)y - T_a(\theta)CT'_e(\theta_1, \theta_2)x_e) + B_u u + B_v v \qquad (66)$$

Then, selection of Ta(θ)C such that Ta(θ)CTe'(θ1,θ2) becomes constant irrespective of θ leads to a linear observer in which an input to the system is considered as Ta(θ)y.

Initially, assuming $$T_a(\theta) = t(\theta) \qquad (67)$$

and C=(C1,C2), in which C1 indicates three front columns and C2 indicates two rear columns, the above condition can be rewritten as follows.

$$T_a(\theta)CT'_e(\theta_1, \theta_2) = \begin{pmatrix} t(\theta)C_1 \hat{t}' t'(\theta_1) & t(\theta)C_2 \hat{t}' t'(\theta_2) \end{pmatrix} \qquad (68)$$

Here, when C1^t'=α1I2 and ^t'=α2I2 (α1 and α2 are constants) are held, Ta(θ)CTe'(θ1,θ2) is a constant matrix. Similar to the above, C is expressed as equation (69).

$$C = \begin{pmatrix} \begin{pmatrix} 1 & 0 & 0 & 1 & 0 & 0 \\ \frac{1}{\sqrt{3}} & \frac{2}{\sqrt{3}} & 0 & \frac{1}{\sqrt{3}} & \frac{2}{\sqrt{3}} & 0 \end{pmatrix} \end{pmatrix} \qquad (69)$$

Similar to the above, Ta(θ)CTe'(θ1,θ2) becomes a constant value with respect to the C. Then, assuming Ct=Ta(θ) CTe'(θ1,θ2) and an input being yt=Ta(θ)y, equation (66) resultantly expresses a linear observer for equation (70).

$$\frac{d}{dt}x_e = A(\omega)x_e + L(\omega)(y_t - C_t x_e) + B_u u + B_v v \qquad (70)$$

It should be noted that an actual observer collectively measures phase currents (iu1 and iu2), and phase currents (iv1 and iv2) to obtain a measurement value ~y as follows.

$$\tilde{y} = \begin{pmatrix} i_{u1} + i_{u2} \\ i_{v1} + i_{v2} \end{pmatrix} + \tilde{w} \qquad (71)$$

Then, using this measured current value as follows, an observer is formed.

$$\frac{d}{dt}x_e = A(\omega)x_e + L(\omega)(T_a(\theta)y - C_t x_e) + B_u u + B_v v \qquad (72)$$

$$y = \begin{pmatrix} i & 0 \\ 1/\sqrt{3} & 2/\sqrt{3} \end{pmatrix} \tilde{y} + \omega \qquad (73)$$

As described above, use of liner observers for equations (72), (73) makes it possible to recognize the state of the motor by observing (iu1+iu2) and (iv1+iv2).

In view of the above, it is concluded that the following methods are available to obtain information necessary to drive a six-phase motor.

(1) A zero-phase current and two other currents (iu1+iu2, iv1+iv2) are measured, and applied to a linear observer.

Figure 6:
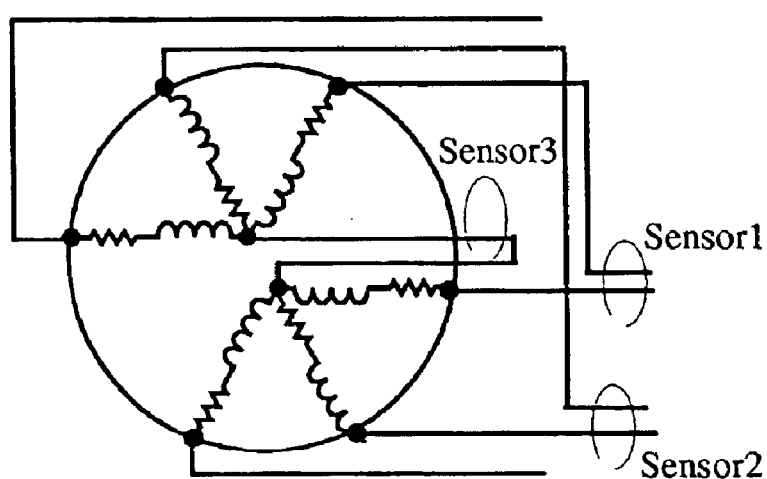
FIG. 6 is a diagram showing an example arrangement of three current sensors with a zero-phase current flowing in an example of two three-phase coils which do not interfere with each other.

Specifically, three sensors (sensors 1 to 3) are provided to measure addition phase currents (iu1+iu2, iv1+iv2) and a zero-phase current, as shown in FIG. 6.

(2) A zero-phase current and another current are measured, and applied to a non-linear observer.

Figure 7:
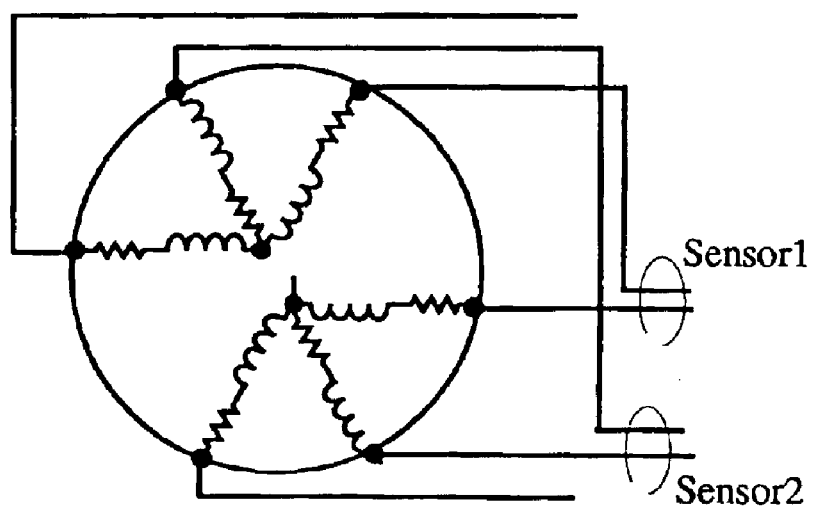
FIG. 7 is a diagram showing an example arrangement of two current sensors with a zero-phase current flowing in the case of two three-phase coils which do not interfere with each other.

Specifically, two sensors (sensors 1 and 2) are provided to measure an addition phase current (iu1+iu2) and a zero-phase current, as shown in FIG. 7.

(Other Structure)

Figure 8:
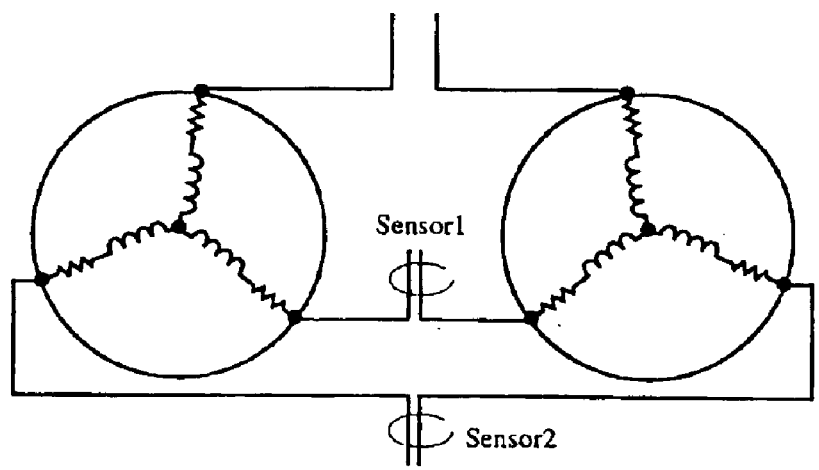
FIG. 8 is a diagram showing an example arrangement of two current sensors in the case of two three-phase motors.
Figure 9:
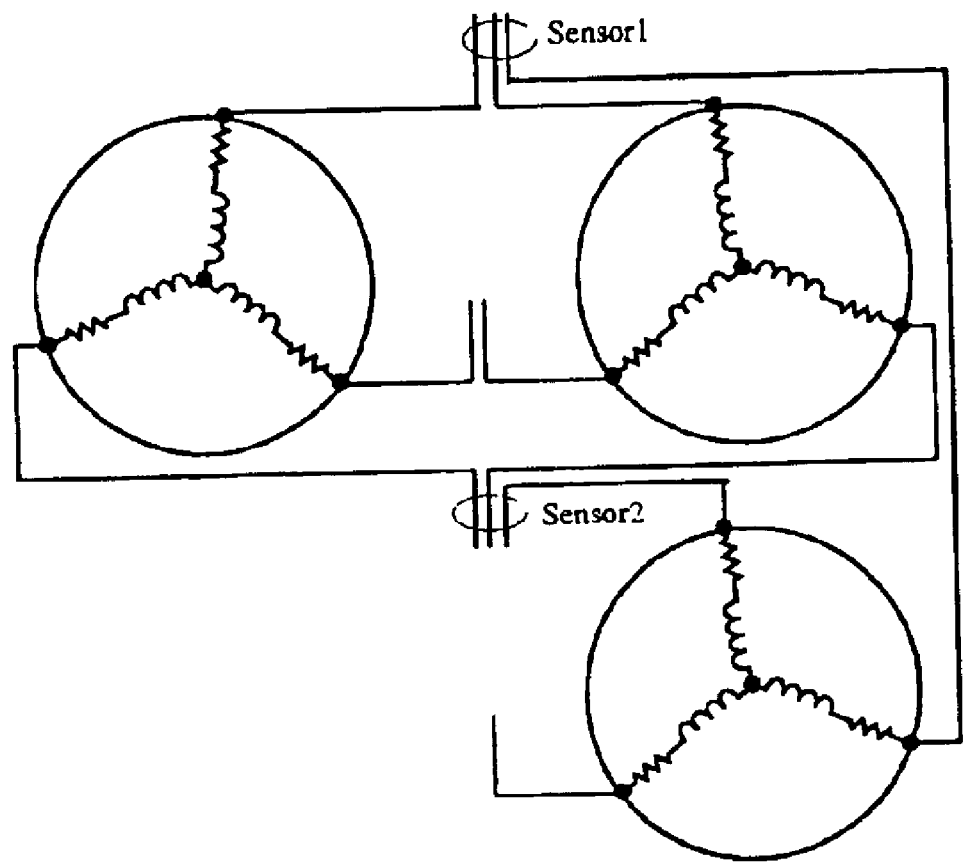
FIG. 9 is a diagram showing an example arrangement of two current sensors in the case of three three-phase motors.

The above description is applicable to a system having two independent motors (with different revolutions and characteristics) as shown in FIG. 8, as well as a system having three motors (with different revolutions and characteristics) as shown in FIG. 9.

Then, a system having three motors will be described.

Initially, an equation for estimation is described as equation (74).

$$\frac{d}{dt}x = A(\omega)x + B_u u + B_v v \qquad (74)$$

$$x = \begin{pmatrix} i_{d1} \\ i_{d2} \\ i_{d3} \\ i_{q1} \\ i_{q2} \\ i_{q3} \end{pmatrix} \qquad (75)$$

$$u = \begin{pmatrix} v_{d1} \\ v_{d2} \\ v_{d3} \\ v_{q1} \\ v_{q2} \\ v_{q3} \end{pmatrix} \qquad (76)$$

$$v = \begin{pmatrix} 0 \\ 0 \\ 0 \\ \omega\psi_m \\ \omega\psi_m \\ \omega\psi_m \end{pmatrix} \qquad (77)$$

Here, as an observable value is of a phase current y, when a system output is expressed as equation (78) in which w indicates an observation noise, an observer can be formed as expressed as equation (80).

$$y = Cx_p + w \qquad (78)$$

$$x_p = \begin{pmatrix} i_{u1} \\ i_{v1} \\ i_{w1} \\ i_{u2} \\ i_{v2} \\ i_{w2} \\ i_{u3} \\ i_{v3} \\ i_{w3} \end{pmatrix} \quad (79)$$

$$\frac{d}{dt}x_e = A(\omega)x_e + \hat{L}(y - CT_e'(\theta_1, \theta_2)x_e) + B_u u + B_v v \quad (80)$$

$$T_e(\theta_1, \theta_2, \theta_3) = \begin{pmatrix} t(\theta_1)\bar{t} & \phi_{2\times3} & \phi_{2\times3} \\ \phi_{2\times3} & t(\theta_2)\bar{t} & \phi_{2\times3} \\ \phi_{2\times3} & \phi_{2\times3} & t(\theta_3)\bar{t} \end{pmatrix} \quad (81)$$

in which C indicates a matrix of two rows and nine columns which takes into consideration observability.

However, as the above equation as is cannot determine an observer gain ^L in equation (80), ^L=L($\omega$)Ta($\theta$) is introduced so that equation (80) can be rewritten as equation (82).

$$\frac{d}{dt}x_e = A(\omega)x_e + L(\omega)(T_a(\theta)y - T_a(\theta)CT_e'(\theta_1, \theta_2, \theta_3)x_e) + B_u u + B_v v \quad (82)$$

Then, selection of Ta($\theta$)C such that Ta($\theta$)CTe'($\theta$1,$\theta$2) is constant irrespective of $\theta$ leads to a linear observer in which an input to a system is considered as Ta($\theta$)y.

Assuming $$T_a(\theta) = t(\theta) \quad (83)$$

and C=(C1, C2, c3), in which C1 indicates three front columns, C2 indicates three middle columns, and C3 indicates three rear columns, the above condition can be described as follows.

$$T_a(\theta)CT_e'(\theta_1, \theta_2, \theta_3) = \begin{pmatrix} t(\theta)C_1\hat{t}'t'(\theta_1) & t(\theta)C_2\hat{t}'t'(\theta_2) & t(\theta)C_3\hat{t}'t'(\theta_3) \end{pmatrix} \quad (84)$$

Here, when C1^t'=$\alpha$1I2, C2^t'=$\alpha$2I2, and C3^t'=$\alpha$3I2 ^t'= $\alpha$2I2 ($\alpha$1, $\alpha$2, and $\alpha$3 are constants) are held, Ta($\theta$)CTe'($\theta$1, $\theta$2, $\theta$3) is a constant matrix. Therefore, C is described as equation (85).

$$C = \begin{pmatrix} \begin{pmatrix} 1 & 0 & 0 & 1 & 0 & 0 & 1 & 0 & 0 \\ \frac{1}{\sqrt{3}} & \frac{2}{\sqrt{3}} & 0 & \frac{1}{\sqrt{3}} & \frac{2}{\sqrt{3}} & 0 & \frac{1}{\sqrt{3}} & \frac{2}{\sqrt{3}} & 0 \end{pmatrix} \end{pmatrix} \quad (85)$$

Similar to the above, Ta($\theta$)CTe'($\theta$1, $\theta$2, $\theta$3) becomes a constant value with respect to the C. Assuming Ct=Ta($\theta$) CTe'($\theta$1, $\theta$2, $\theta$3) and an input being yt=Ta($\theta$)y, equation (82) resultantly expresses a linear observer for equation (86).

$$\frac{d}{dt}x_e = A(\omega)x_e + L(\omega)(y_t - C_t x_e) + B_u u + B_v v \quad (86)$$

It should be noted that an actual observer collectively measures phase currents (iu1+iu2+iu3) and (iv1+iv2+iv3) to obtain an observation value ~y as follows.

$$\tilde{y} = \begin{pmatrix} i_{u1} + i_{u2} + i_{u3} \\ i_{v1} + i_{v2} + i_{v3} \end{pmatrix} + \tilde{w} \quad (87)$$

Then, using this measured current value as follows, an observer is formed.

$$\frac{d}{dt}x_e = A(\omega)x_e + L(\omega)(T_a(\theta)y - C_t x_e) + B_u u + B_v v \quad (88)$$

$$y = \begin{pmatrix} 1 & 0 \\ 1/\sqrt{3} & 2/\sqrt{3} \end{pmatrix} \tilde{y} + w \quad (89)$$

As described above, use of a linear observer of equations (88) and (89) makes it possible to recognize the state of the motor by observing (iu1+iu2+iu3) and (iv1+iv2+iv3).

In view of the above, it is concluded that the following methods are available to obtain information necessary to drive three independent motors.

(1) Currents (iu1+iu2+iu3, iv1+iv2+iv3) are measured, and applied to a linear observer.

Specifically, two sensors (sensors 1 and 2) are provided to measure addition phase currents (iu1+iu2+iu3, iv1+iv2+iv3), as shown in FIG. 9.

It should be noted that, although an addition phase current is measured in the above, a current of one three-phase coil alone may be measured to as input for an observer.

(Estimation Result)

Figure 10:
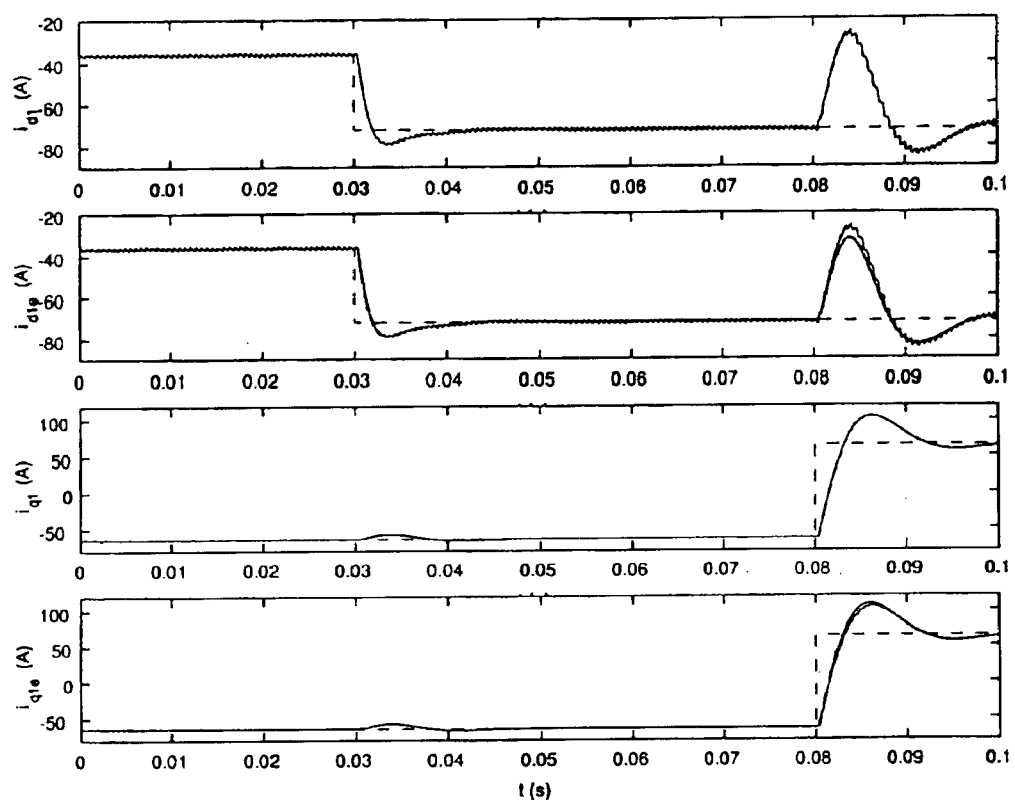
FIG. 10 is a diagram showing estimation performance by a discrete observer.

FIG. 10 shows estimated results. The results relate to a normal six-phase motor, and show d and q axial currents of a first star connection. Specifically, the first to four graphs, up to down, respectively show relationship between an actual value and a target value (the broken line) of id1, relationship among an estimated value, an actual value, and a target value (the broken line) of id1, relationship between an actual value and a target value (the broken line) of iq1, and relationship between an estimated value, an actual value, and a target value (the broken line) of iq1.

Although, when a current id1 varies (see a region around t=0.085 in the second graph), an estimation error of A is caused, this error is quickly reduced, and almost no error is caused in other regions. That is, it is concluded that use of an observer in this embodiment enables estimation of a current value with satisfactory accuracy.

As described above, use of an observer for estimation of the state of a motor allows reduction of the number of currents to be measured, and thus achieves a simplified system.

As described above, in this embodiment of the present invention, in which a motor model or a model showing the state of a motor is used in motor current estimation, the number of currents to be measured of a multi-phase coil, such as a three-phase coil, can be reduced.

What is claimed is:

1. A driving control device for a motor having a plurality of multi-phase coils configured to generate a rotating magnetic field to cause a rotor to rotate, comprising:

a measuring device configured to measure one or more phase currents selected from a plurality of independent phase currents corresponding to the plurality of multi-phase coils, a number of phase currents being measured limited to a range between one and a number smaller than a total number of the independent phase currents;

a control signal generating circuit connected to said measuring device and configured to estimate a state of said motor by using the measured one or more phase currents and one of a motor model and a model showing a state of the motor, said control signal generating circuit further configured to generate a driving control signal based on said estimated state, said driving control signal used by said driving control device to control each of the phase currents.

2. The device according to claim 1, further comprising:

a second measuring device configured to measure a current flowing between neutral points of two of the plurality of multi-phase coils, the two multi-phase coils being connected to each other at respective neutral points, wherein the number of phase currents being measured is at least two, and the control signal generating circuits utilizes the measured neutral point current, the at least two measured addition phase currents, and the motor model is a non-linear model.

3. The device according to claim 1, wherein at least two of the plurality of multi-phase coils are independent, and the motor model is a non-linear model.

4. The device according to claim 1, wherein the plurality of multi-phase coils is a three-phase coil.

5. A driving control device for a motor having a plurality of multi-phase coils for configured to generate a rotating magnetic field to cause a rotor to rotate, comprising:

a measuring device configured to measure one or more addition phase currents selected from a plurality of addition phase currents, a number of phase currents being measured limited to a range between one and a number smaller than a total number of addition phase currents, the addition phase current being an addition of phase currents of at least two of the plurality of multi-phase coils; and a control signal generating circuit connected to said measuring device and configured to estimate a state of said motor by using the measured one or more addition phase currents and one of a motor model and a model showing a state of the motor said control signal generating circuit further configured to generate a driving control signal based on said estimated state, said driving control signal used by said driving control device to control each of the chase currents.

6. The device according to claim 5, further comprising:

a second measuring device configured to measure a current flowing between neutral points of two of the plurality of multi-phase coils, the two multi-phase coils being connected to each other at respective neutral points, wherein the number of phase currents being measured is at least two, and the control signal generating circuit is connected to said second measuring device and is further configured to use the measured neutral point current, the at least two measured addition phase currents, and said motor model is a linear model.

7. The device according to claim 5, further comprising:

a second measuring device configured to measure a current flowing between neutral points of two of the plurality of multi-phase coils, the two multi-phase coils being connected to each other at respective neutral points, wherein the number of phase currents being measured is at least two, and the control signal generating circuit is connected to said second measuring device and is further configured to use the measured neutral point current, the at least two measured addition phase currents, and said motor model is a non-linear model.

8. The device according to claim 5, wherein at least two of the plurality of multi-phase coils are independent, the addition phase current measuring device is configured to measure at least two addition phase currents, and the motor model is a linear model.

9. The device according to claim 5, wherein at least two of the plurality of multi-phase coils are independent, and the motor model is a non-linear model.

10. The device according to claim 5, wherein the plurality of multi-phase coils is a three-phase coil.

* * * * *